United States Patent [19]

Mitani

[11] Patent Number: 5,140,123
[45] Date of Patent: Aug. 18, 1992

[54] CONTINUOUS MANUFACTURING METHOD FOR A METAL WELDED TUBE AND A MANUFACTURING APPARATUS THEREFOR

[75] Inventor: Kazuo Mitani, Tokyo, Japan

[73] Assignee: Kusakabe Electric & Machinery Co., Ltd., Kobe, Japan

[21] Appl. No.: 528,990

[22] Filed: May 25, 1990

[51] Int. Cl.$^5$ .............................................. B23K 13/01
[52] U.S. Cl. .................................. 219/61.2; 219/60 R; 219/61
[58] Field of Search ...................... 219/61.2, 61, 60 R

[56] References Cited

U.S. PATENT DOCUMENTS

| | | |
|---|---|---|
| 3,270,176 | 8/1966 | O'Neill et al. ...................... 219/61.2 |
| 3,294,928 | 12/1966 | Schäfer ............................... 219/61.2 |
| 3,585,337 | 6/1971 | Rudd ................................... 219/61.2 |
| 3,707,257 | 12/1972 | Wogerbauer et al. . |
| 4,339,938 | 7/1982 | Nakagawa et al. . |
| 4,709,845 | 12/1987 | Akiyama et al. . |

FOREIGN PATENT DOCUMENTS

| | | | |
|---|---|---|---|
| 59-191577 | 10/1984 | Japan ................................. 219/61.2 |
| 60-199582 | 10/1985 | Japan ................................. 219/61.2 |
| 61-37385 | 2/1986 | Japan ................................. 219/61.2 |
| 62-134181 | 6/1987 | Japan ................................. 219/61.2 |
| 1017454 | 5/1983 | U.S.S.R. ............................ 219/61.2 |

*Primary Examiner*—Clifford C. Shaw
*Attorney, Agent, or Firm*—Armstrong, Nikaido, Marmelstein, Kubovcik & Murray

[57] ABSTRACT

A continuous manufacturing method for a metal welded tube and a manufacturing apparatus therefor, which obtains a tubular member by continuously passing a metal band coil through molding rollers, guides the tubular member to abutting rollers to bring the edges thereof in slight contact with each other so as to form a V-throat having the vertex of an edge contact portion at the upstream side of the abutting rollers, disposes an inductor of a high frequency preheating unit aiming at edge preheating at the outer periphery in front of the abutting point of the V-throat and at need disposes an impeder also at the inner surface of the V-throat, and further disposes welding torches in a single or double rows of a welding unit for melting and welding the tubular member by welding high density energy at the upstream side of the abutting rollers including the line connecting the centers thereof.

2 Claims, 4 Drawing Sheets

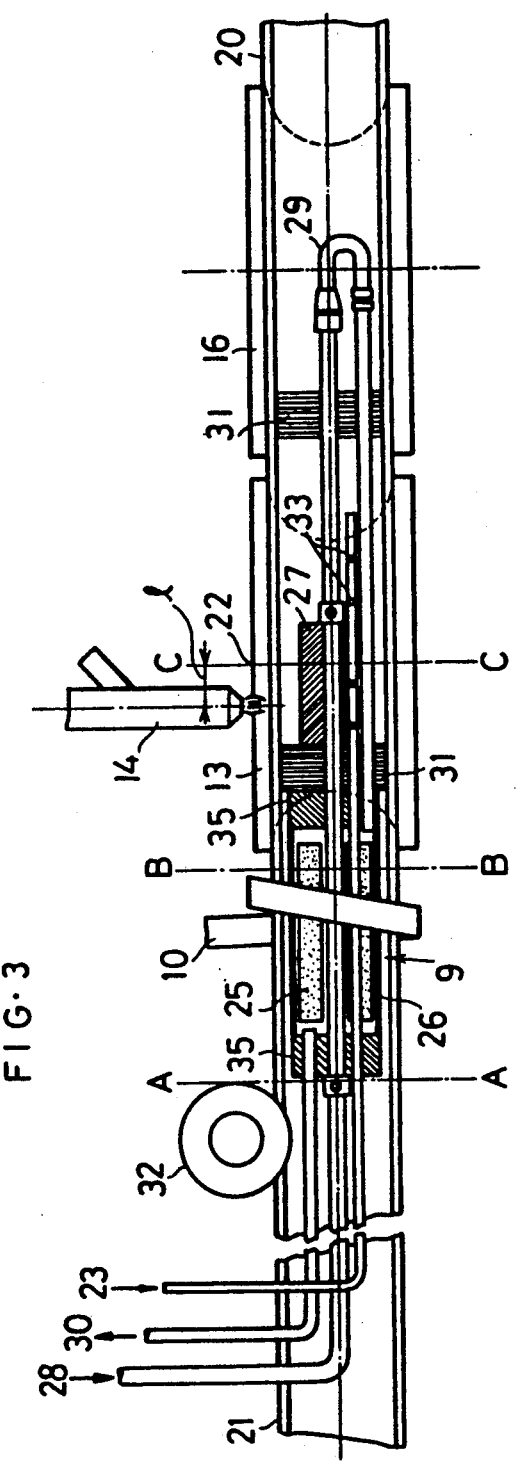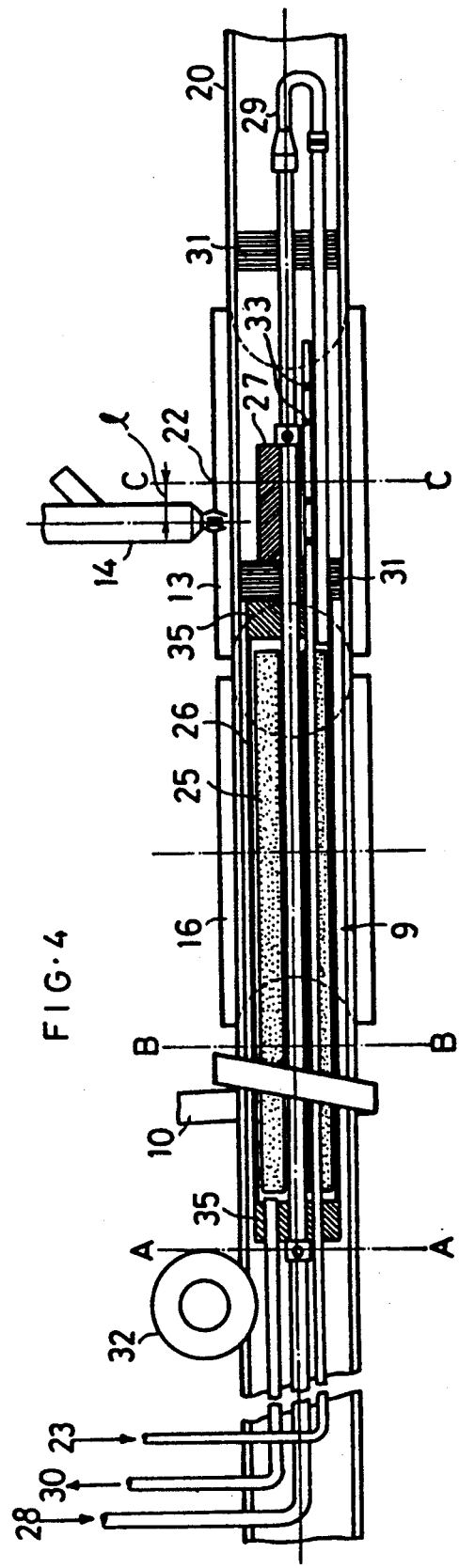
FIG. 3
FIG. 4

CONTINUOUS MANUFACTURING METHOD FOR A METAL WELDED TUBE AND A MANUFACTURING APPARATUS THEREFOR

FIELD OF THE INVENTION

The present invention relates to a continuous manufacturing method for a metal welded tube and a manufacturing apparatus therefor, which method combines high frequency preheating with a high density energy melting and welding method in order to high efficiently manufacture a welded tube of a highly quality welded portion from material, such as stainless steel or titanium, relatively hard to weld.

PRIOR ART

In a case where a metalic band material, such as stainless steel or titanium, is rolled to be a continuously tubular member and the edges thereof are welded to manufacture the welded tubes, conventionally the most usual welding method is used which includes, other than the high frequency welding method, a single or double row torch welding method, such as a TIG (Tungsten Inert Gas) welding method, utilizing arc energy of high density, or a compound welding method of combining the TIG welding method with the plasma welding method.

There is a laser welding method and an electron beam welding method as the welding method to utilize high density energy, which at present are used merely for partially special use regarding manufacture of metal welded tubes.

SUMMARY OF THE INVENTION

Among the above-mentioned welding methods, the high frequency welding method uses heat press-contact welding for joining in principle, so that a large range of the edge of a tubular member should be heated at high temperature in the stage before joining.

Therefore, a not-weldable material of strong oxidizing tendency, a large-in-thickness material, or a hard material, is apt to hold oxides produced for the heating process between the junction surfaces even after completion of a junction, whereby the welding quality is liable to be left non-reliable.

Accordingly, when the high frequency welding method at present commercially manufactures, for example, stainless steel tubes or the like, the method is limited to be used for a product which is not so definitely important in reliability of the welded portion, or for a tube smaller in thickness easy to weld at high speed.

On the other hand, the TIG welding method or plasma welding method utilizing the high density arc energy is melting and welding in principle, which is advantageous in that the welded portion quality of far higher reliability in comparison with the above-mentioned high frequency welding method is surely obtained.

Accordingly, the above-mentioned methods are at present the most generally used in a manufacturing field for high class welded tubes, such as stainless steel tubes. However, these welding methods are the most defective in that the welding speed is extremely slow.

As a countermeasure for high speed welding, for example, the welding torches in double rows or a compound welding method combining different welding methods, such as a TIG welding method and a plasma welding method. These methods, however, cannot be said to demonstrate a sufficient mass production effect.

Each time the production increases a little at the manufacturing factory, in its present state the production line should be added by expensive equipment investment.

In order to solve the above-mentioned problem, the present invention has been designed. An object thereof is to provide a continuous metal welded tube manufacturing method and an apparatus therefor, which, when welded tubes are manufactured from material, such as stainless steel or titanium, relatively hard to weld, obtains superior welding quality equal to that obtained by the melting and welding method of high density energy represented by the TIG welding method, plasma welding method, and laser welding method, and such welding is attained by high welding speed corresponding to the high frequency welding method, thereby effectively coping with recently rapid progress of demand for the high class welded tube as well as the stainless steel tube.

In order to attain the above-mentioned object, in the present invention, at first a metal band coil continuously passes mold rollers to thereby obtain a tubular member, which is guided to abutting rollers and lightly contacts at the edges of tubular member with each other, so that a V-throat having at the vertex the edge contact is formed at the upstream side of abutting rollers.

At the outer periphery of the tubular member in front of the abutting point of the V-throat is disposed an inductor for a high frequency preheating unit aiming at edge preheating, and an inductor at need is disposed also at the inner surface of V-throat. Furthermore, at the upstream side of the abutting rollers including the line connecting the centers thereof are disposed welding torches in single or double rows at a melting and welding unit by the welding high density energy.

The compound welding apparatus constructed as above-mentioned joints the edges of tubular member to produce a welded tube in such a manner that the inductor at the high frequency preheating unit is applied with voltage, the tubular member while being selectively preheated only at the edges of the V-throat in the proximity effect, and the welding torch connected with an oscillator of high density energy for welding is disposed on the line connecting the centers of abutting rollers or at the upstream side thereof, is used to melt and weld the abutting edges of tubular member entirely thicknesswise thereof.

In the above-mentioned welding process, the edge heating by the high frequency preheating unit is to be performed in a welding temperature range wherein there is no fear that the material rapidly progresses in oxidization to remain oxides at the abutting welded surfaces. Also, pressure by the abutting rollers onto the edges must be proper to well control the weld bead configuration. In other words, an optimum value depending on the quality and size of tube, preheat temperature, kind and number of welding torches, and welding speed, is experientially decided.

In the present invention, as the above-mentioned, the apparatus, which joints the edges of the metal tubular member by separating high frequency preheating from high density energy melting and welding, uses the high frequency preheating in the temperature range not to rapidly progress oxidization of metal at a high temperature, thereby gradient-using most of welding energy of high density for the melting and welding. Hence, it is possible to perform high speed welding to meet the preheating temperature while avoiding a welding defect.

BRIEF DESCRIPTION OF THE DRAWINGS

FIG. 3 shows the preheating and melting and welding process of the welding apparatus of the invention, in which a cooling method for an inductor and an arc protector and an inert gas feed method are shown, especially the abutting rollers and welding torch being disposed at the upstream side of the auxiliary abutting rollers, FIG. 4 shows, as the same as FIG. 3, the cooling method and inert gas feed method, especially the abutting rollers and welding torch being disposed at the downstream side of the auxiliary abutting rollers.

DESCRIPTION OF THE PREFERRED EMBODIMENT

Figure 1:
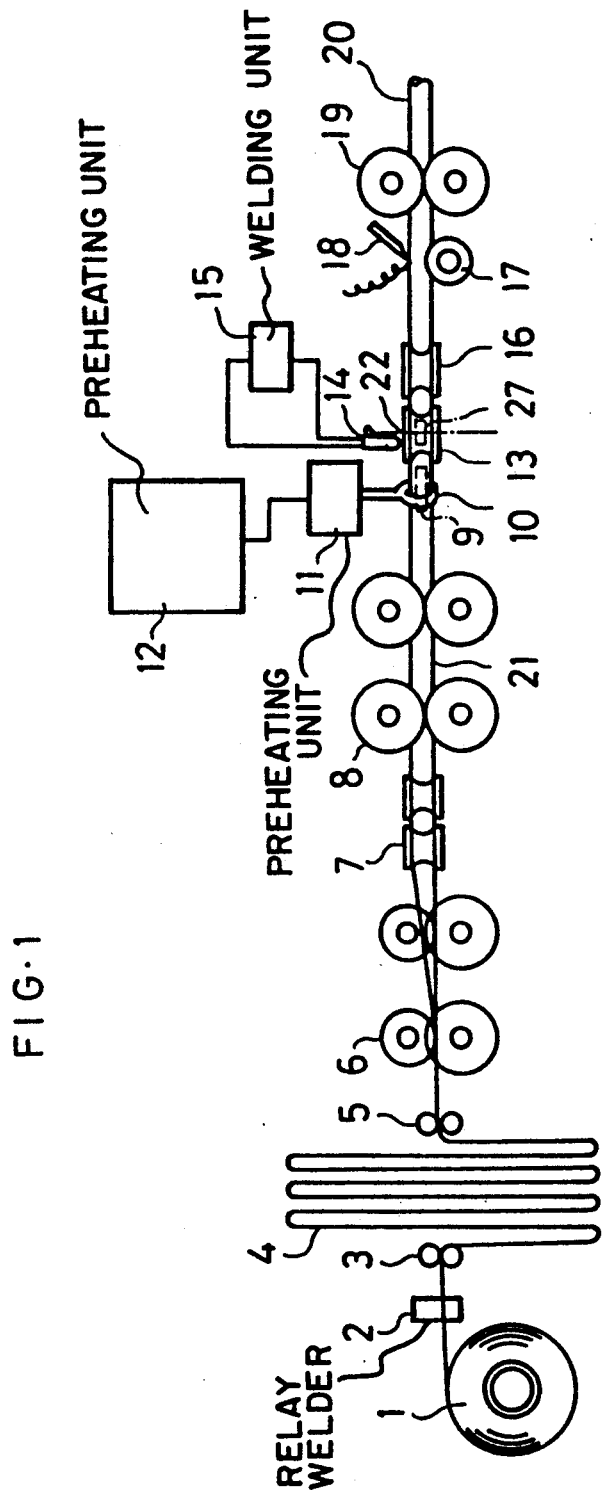
FIG. 1 shows a manufacturing process of a metal welded tube by a continuous manufacturing method of the invention.

A concrete construction of the invention will be described with reference to the drawings. FIG. 1 shows a manufacturing process for a welded tube in accordance with the invention, in which a metal band coil 1 is uncoiled, a relay welder 2 sequentially joints the edges of coil, the coil 1 is sent by inlet side pinch rollers 3 to a looper 4 and continuously discharged through outlet side pinch rollers 5, and a tubular member 21 is obtained through plural molding rollers 6, 7 and 8.

Next, the edges of the tubular member 21 are properly guided by a seam guide 32 to the abutting rollers 13, wherein a V-throat putting at the top the center line 22 connecting the centers of rollers 13 is formed.

The V-throat comprises a preheating region and a melting and welding region of the edges of the tubular member 21, wherein an inductor 10 for a high frequency preheating unit 12 is disposed and an inductor 9, if necessary, is also disposed at the inner surface of the tubular member corresponding to the inductor 10.

A welding torch 14 of a welding unit 15 for melting and welding the preheated abutting edge surfaces is disposed on the center line 22 connecting the centers of abutting rollers or at the upstream side thereof.

A metal welded tube 20 molten and welded through the edge abutting surfaces, after the welded beads are processed by a smoothing unit 18, is discharged rearwardly by a pull-out roller 19.

Figure 2:
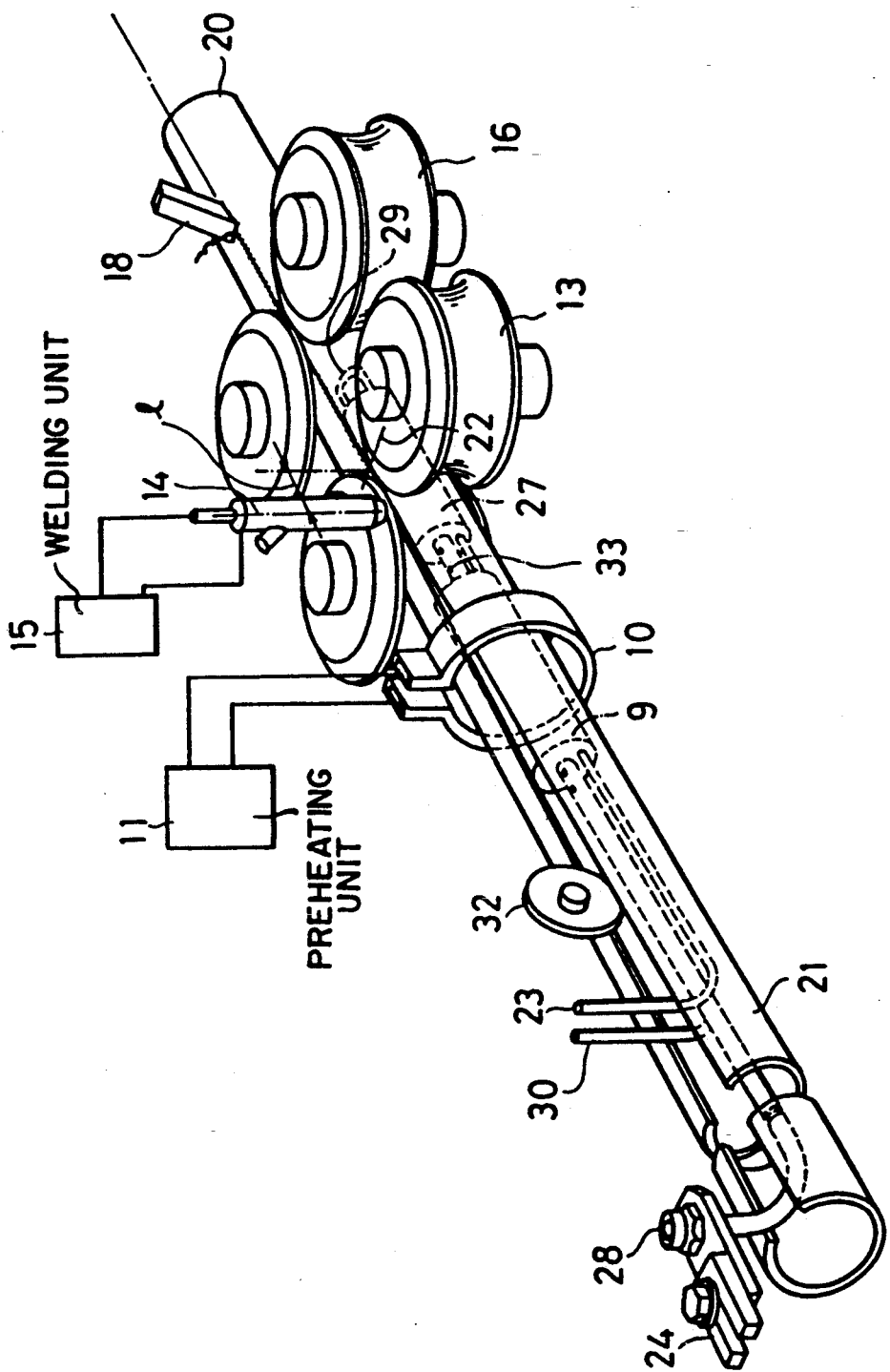
FIG. 2 is a perspective view of a preheating and a welding unit of the invention, in which an inductor, abutting rollers, a welding torch, auxiliary abutting rollers and bead smoothing unit are disposed in order.

FIG. 2 is a perspective view of the main components, such as the preheating inductor 10, welding torch 14, an impeder 9, of the invention, which are concretely shown.

The abutting rollers 13 are provided which introduce therebetween the tubular member 21 obtained from the metal band coil 1 having passed through the molding rollers 6, 7 and 8. An object of disposing the abutting rollers 13 is that the edges of the tubular member are brought into contact under slight pressure and a V-throat, whose vertex is the line 22 connecting the centers of abutting rollers 13, is formed together with the seam guide 32 so as to obtain the preheating region and melting and welding region, and that a moderate compression is applied to the melting and welding part so as to obtain a proper bead configuration free from the welding defeat, such as under cut.

A current applied to the inductor 10 at the high frequency preheating unit selectively heats a restricted region between both the edges of V-throat by the proximity effect. The welding torch 14 of an arc generating unit 15 for melting and welding the preheated edges is located on the line 22 connecting the centers of abutting rollers or at the upstream side thereof and in the position where the abutting rollers 13 can apply moderate compression to the welding part.

However, the optimum position of welding torch 14 is experientially decided by the quality and size of metal, preheating temperature, kind and number of welding torch, welding speed, welding bead configuration and the like.

There is the danger that the once molten and welded abutting surfaces may be again open by springing back due to the size, quality and welding speed of welding material. It is required for preventing such danger to dispose at need another one pair of auxiliary abutting rollers 16 in proximity to the rear of the abutting rollers 13.

FIG. 3 is a structural view of the impeder 9 and an arc protector 27 connected thereto at the downstream side in the inner surface of the tubular member.

The impeder 9, when the inductor 10 at the high frequency preheating unit 12 is energized, operates to collectively heat the edges only of the V-throat region.

A ferrite core 25 constituting the impeder 9 is housed and sealed in an impeder casing 26 formed of glass fiber reinforcement resin, and at the front and the rear of the an impeder casing 26, an impeder casing support members 35 are fitted into the tubular member.

In the front and rear regions of the melting and welding point at the downstream side of impeder in the tubular member 21, the arc protector 27 of, for example copper, is connected to the impeder 9 to prevent the inner surface of tube from being damaged by high energy arc from the welding torch.

Cooling water from a cooling water supply conduit 28 once passes through the inside of impeder 9 and that of arc protector 27 to reach the rear and then is collected through a cooling water collection conduit 30 after the arc protector 27 and ferrite core 25 in the impeder casing 26 are cooled through a connecting pipe 29.

Inert gas for gas-sealing all the periphery or part thereof of the preheating region and melting and welding part is guided by an inert gas feed pipe 23 into the tube 21 and ejected from a nozzle 33 at the utmost end of pipe 23, thereby keeping a range partitioned by a sealing partition 31 in a non-oxidization atmosphere.

FIG. 4 is a structural view of the impeder 9, arc protector 27 and feeding method for cooling water or inert gas in the tube of the invention.

Figure 5:
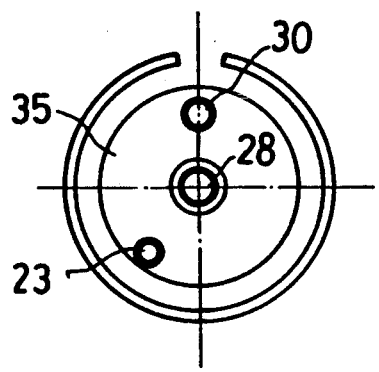
FIG. 5 is a sectional view taken on the lines A—A in FIGS. 3 and 4.
Figure 6:
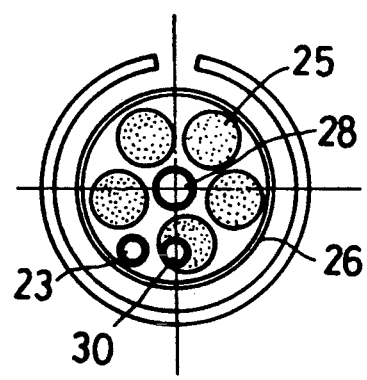
FIG. 6 is a sectional view taken on the lines B—B in FIGS. 3 and 4.
Figure 7:
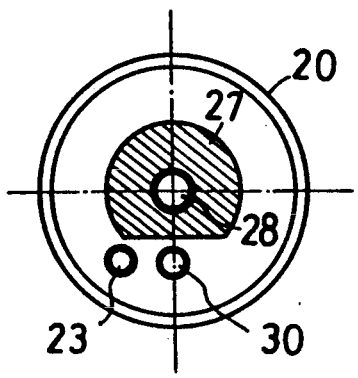
FIG. 7 is a sectional view taken on the lines C—C in FIGS. 3 and 4.

FIGS. 5, 6 and 7 are sectional views taken on the lines A—A, B—B and C—C in FIGS. 3 and 4.

Especially, in FIG. 4 the abutting rollers 13, welding torch 14 and auxiliary abutting rollers 16 are disposed in the reverse order to FIG. 3, in other words, the abutting rollers 13 and welding torch 14 are moved to the downstream side of the auxiliary abutting rollers 16, thereby obtaining the same welding effect as FIG. 3.

For preheating of the invention, induction coils and contact tips of all configuration, which can selectively heat the edges of tubular member, are usable as the inductor 10 at the high frequency preheating unit.

Also, the optimum frequency of high frequency current may be properly selected in a range of 10 through 1000 Hz corresponding to the welding condition, such as quality, thickness and welding speed of metal.

Furthermore, for melting and welding the preheated edges, laser welding and electron welding, other than the plasma welding method, single row method of TIG welding, double row torch method, and compound welding method of combining the TIG welding method with the plasma welding method, are effectively usable.

Also, in order to prevent oxidization when the edges of metal material are preheated and molten and welded, it is included in the present invention that all or part of V-throat region is at need inert-gas-sealed from the outer surface of the tube.

As seen from the above, the present invention, when welded tubes are manufactured from non-weldable material, such as stainless steel or titanium demonstrates the following effects:

① For manufaturing the metal welded tube, both the processes of preheating and melting-welding the molded tubular member are separated from each other, so that the edge preheating is alloted to high frequency heating superior in heating efficiency.

Hence, since the high density are energy is given mainly in the melting and welding of preheated edges, the method of the invention is weldable more rapidly than the conventional arc welding method only.

② The welding speed increases to at least double the production capacity per one equipment line. Hence, the production time and delivery date are expected to be reduced and cost savings are anticipated due to improved productivity.

③ Since the high frequency preheating of edges of tubular number is stopped at a temperature of not remarkably progressing edge oxidization in a range under the melting point of metal, the fear that oxide remains on the welded abutting surfaces after melting and welding is substantially completely avoidable.

Accordingly, the present invention can manufacture a high reliable welded tube by high speed welding especially from metal of large oxidization tendency or non-weldable material.

④ The present invention is different from the case where the high frequency welding is solely used to obtain the welded tube by heat press-contact, so that the high density energy is used to melt and weld the abutting surfaces in principle, whereby there is no need that a strong upset is used for squeezing out the oxide at the abutting edge surfaces.

As the result, while beads are controlled in a small and uniform configuration, a proper welded tube of non under cut is simultaneously obtainable.

⑤ Since the metal edges are preheated at the stage prior to welding, the conventional non-weldable material, which requires groove preheating as preparation prior to welding, can be weldable without such groove preheating. Also, the preheating effect by the same high frequency may omit annealing of the welding portion after welding.

What is claimed is:

1. A manufacturing method for making a metal welded tube, comprising the steps of:
   providing a metal band coil for supplying a metal band, a plurality of molding rollers for molding said metal band into a tubular member, abutting rollers abutting edge surfaces of the tubular member disposed downstream from said plurality of molding rollers, a high frequency preheating unit including an inductor disposed between said abutting rollers and said plurality of molding rollers, an impeder disposed within said tubular member corresponding to said inductor, a high density energy melting and welding unit, and an inert gas feed nozzle disposed within said tubular member corresponding to said energy melting and welding unit;
   sequentially passing said metal band through said plurality of molding rollers while uncoiling said metal band from said metal band coil, to form a tubular member from said metal band which surrounds said impeder, said tubular member having abutting edge surfaces;
   preheating said tubular member to a temperature lower than a welding temperature of said metal band using said inductor and impeder of said high frequency preheating unit;
   guiding said tubular member between said abutting rollers;
   using said welding torch of said high density energy melting and welding unit at an upstream side of a line connecting the centers of said abutting rollers, for melting and welding the preheated said abutting edge surfaces of said tubular member while using said abutting rollers to maintain said abutting edge surfaces together, to produce said welded tube.

2. A manufacturing apparatus for producing a metal welded tube, comprising:
   a metal band coil for supplying a metal band;
   a plurality of molding rollers for molding said metal band into a tubular member having abutting edge surfaces;
   abutting rollers disposed downstream from said plurality of molding rollers;
   a high frequency preheating unit including an inductor disposed between said abutting rollers and said plurality of molding rollers;
   an impeder disposed within said tubular member corresponding to said inductor;
   a high density energy melting and welding unit;
   and an inert gas feed nozzle disposed within said tubular member corresponding to said melting and welding unit; whereby the abutting edge surfaces of said tubular member are guided between said abutting rollers while being preheated at a temperature lower than a welding temperature for said metal band coil by said inductor of said high frequency preheating unit and subsequently further heating by said impeder and said welding torch of said high density energy melting and welding unit disposed at the upstream side of said abutting rollers, thereby melting and welding said preheated abutting edge surfaces of said tubular member to produce said metal welded tube.

* * * * *